United States Patent
Kim

(10) Patent No.: US 9,848,154 B2
(45) Date of Patent: Dec. 19, 2017

(54) COMPARATOR WITH CORRELATED DOUBLE SAMPLING SCHEME AND OPERATING METHOD THEREOF

(71) Applicant: SK hynix Inc., Gyeonggi-do (KR)

(72) Inventor: Tae-Gyu Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/419,372

(22) Filed: Jan. 30, 2017

(65) Prior Publication Data

US 2017/0302871 A1 Oct. 19, 2017

(30) Foreign Application Priority Data

Apr. 19, 2016 (KR) .................. 10-2016-0047398

(51) Int. Cl.
| | | |
|---|---|---|
| H04N 5/378 | (2011.01) | |
| H04N 5/3745 | (2011.01) | |
| H04N 5/369 | (2011.01) | |

(52) U.S. Cl.
CPC ........... *H04N 5/378* (2013.01); *H04N 5/3698* (2013.01); *H04N 5/37452* (2013.01); *H04N 5/37455* (2013.01); *H04N 5/37457* (2013.01)

(58) Field of Classification Search
CPC .. H04N 5/378; H04N 5/3698; H04N 5/37452; H04N 5/37455; H04N 5/37457; H03M 3/342
USPC ......................................................... 348/300
See application file for complete search history.

(56) References Cited

U.S. PATENT DOCUMENTS

| | | | | |
|---|---|---|---|---|
| 8,072,512 B2 * | 12/2011 | Lee | ..................... | H03M 1/1019 |
| | | | | 348/241 |
| 8,081,243 B2 * | 12/2011 | Chou | .................. | H04N 5/2173 |
| | | | | 348/241 |
| 8,149,289 B2 * | 4/2012 | Lim | ........................ | H03M 1/56 |
| | | | | 348/222.1 |
| 8,754,956 B2 * | 6/2014 | Lim | ........................ | H03M 1/56 |
| | | | | 348/222.1 |
| 8,773,552 B2 * | 7/2014 | Egawa | ................... | H04N 5/378 |
| | | | | 250/208.1 |
| 8,841,594 B2 * | 9/2014 | Lee | .......................... | H03K 4/08 |
| | | | | 250/208.1 |

(Continued)

FOREIGN PATENT DOCUMENTS

| | | |
|---|---|---|
| KR | 1020130072762 | 7/2013 |
| KR | 101460049 | 11/2014 |

*Primary Examiner* — Pritham Prabhakher
(74) *Attorney, Agent, or Firm* — IP & T Group LLP

(57) ABSTRACT

A comparator includes: a comparison block suitable for comparing a pixel signal and a plurality of ramp signals; a correlated double sampling (CDS) block operatively coupled among a first input terminal receiving a first ramp signal used for first and third steps, a third input terminal receiving the pixel signal, and a negative input terminal of the comparison block, and suitable for performing CDS; a switch coupled between a second input terminal receiving a second ramp signal used for a second step and a positive input terminal of the comparison block; a capacitor coupled between a ground terminal and the positive input terminal of the comparison block; an amplification block suitable for buffering a comparison signal outputted from the comparison block; and a feedback control unit suitable for generating a control signal for controlling the switch based on the buffered comparison signal.

10 Claims, 8 Drawing Sheets

(56) References Cited

U.S. PATENT DOCUMENTS

| | | | |
|---|---|---|---|
| 9,578,268 B2* | 2/2017 | Kim | H04N 5/378 |
| 9,621,829 B1* | 4/2017 | Boemler | H04N 5/37455 |
| 9,774,318 B2* | 9/2017 | Song | H03K 4/48 |
| 2012/0001055 A1* | 1/2012 | Lee | H03K 4/08 |
| | | | 250/208.1 |
| 2012/0006974 A1* | 1/2012 | Egawa | H04N 5/3742 |
| | | | 250/208.1 |
| 2012/0038809 A1* | 2/2012 | Lee | H04N 5/3575 |
| | | | 348/308 |
| 2015/0350585 A1* | 12/2015 | Kim | H04N 5/378 |
| | | | 348/308 |
| 2016/0248409 A1* | 8/2016 | Song | H03K 4/48 |
| 2017/0195607 A1* | 7/2017 | Bulteel | H04N 5/37455 |

* cited by examiner

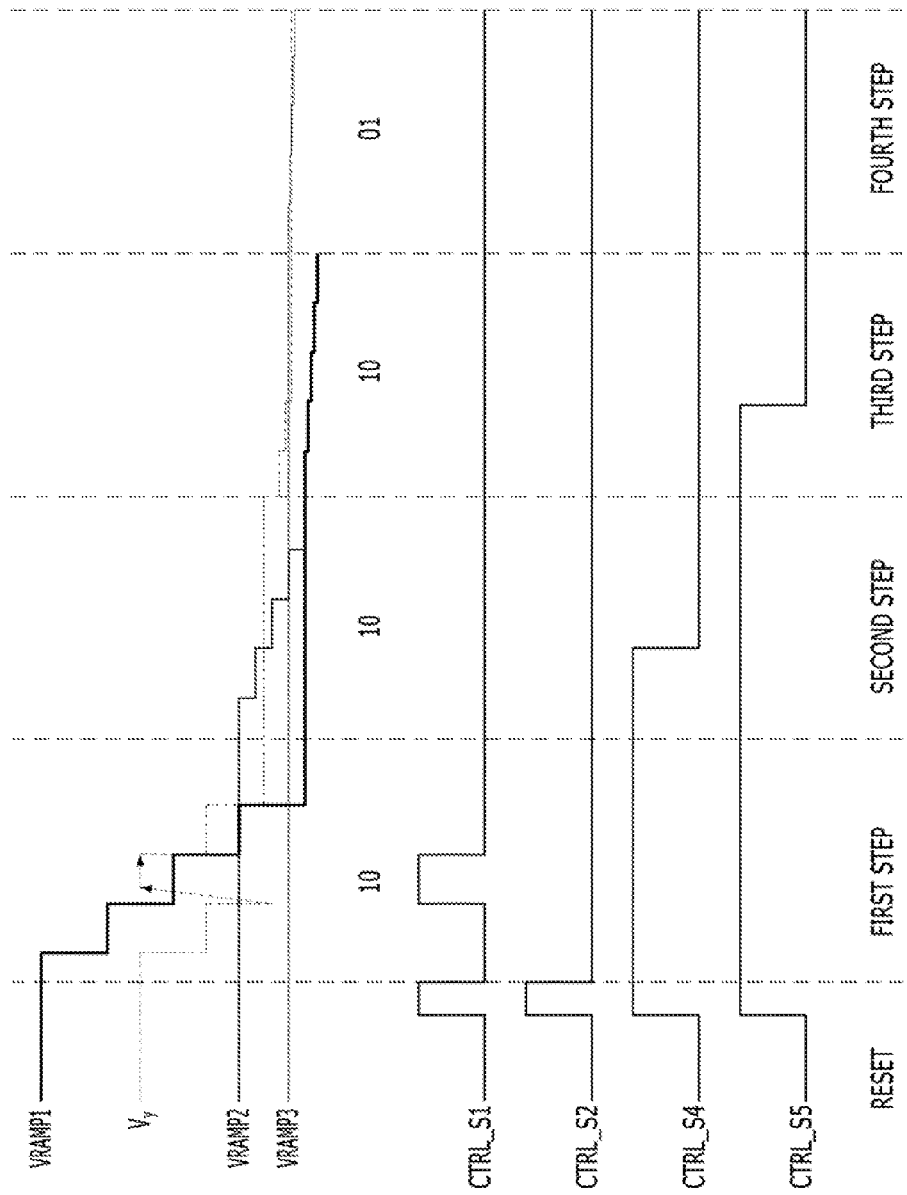

COMPARATOR WITH CORRELATED DOUBLE SAMPLING SCHEME AND OPERATING METHOD THEREOF

CROSS-REFERENCE TO RELATED APPLICATIONS

The present application claims priority under 35 U.S.C. 119(a) to Korean Patent Application No. 10-2016-0047398, filed on Apr. 19, 2016, which is incorporated herein by reference in its entirety.

BACKGROUND

1. Field

Exemplary embodiments of the present invention relate generally to an image sensor and, more particularly, to a high-speed, high-resolution comparator with a correlated double sampling (CDS) having a multi-step structure, an operating method thereof and a CIS using the same.

2. Description of the Related Art

Image sensing devices capture images using photosensitive properties of semiconductors. Image sensing devices are generally classified into charge-coupled device (CCD) image sensors and complementary metal-oxide semiconductor (CMOS) image sensors. CMOS image sensors allow both analog and digital control circuits to be integrated in a single integrated circuit (IC), making CMOS image sensors the most widely used type of Image sensors. Further, CMOS image sensors have advantages of lower power consumption, a lower price and a smaller size compared to those of other competitive products. Since a column-parallel, analog-to-digital converter (ADC) has a structure that is well balanced in a frame rate, area and power, the column-parallel ADC is widely used in the CMOS image sensors. Furthermore, when an ADC is arranged at each column, a single slope ADC is typically used.

Following recent improvements in image quality, the range of applications for the CMOS image sensors has been gradually expanding to include even video applications requiring a high frame rate and high resolution.

However, a single slope ADC has a conversion time that increases exponentially as a function of resolution, which limits the frame rate of the CMOS image sensor. To address this concern, a two-step, single slope ADC has been proposed to acquire a high-speed characteristic. However, in order to implement a CIS which has a high frame rate while exhibiting high resolution, a high-performance high-speed ADC is required. For the high-performance and high-speed ADC, researches are being continuously conducted on the multi-step analog-to-digital conversion technology.

SUMMARY

Various embodiments are directed to a comparator with a correlated double sampling (CDS) scheme, which may easily expand the number of steps using ramp signals with different slopes for the respective steps while reducing the size and the power consumption, and an operating method thereof.

In an embodiment, a comparator may include: a comparison block suitable for comparing a pixel signal and a plurality of ramp signals; a correlated double sampling (CDS) block operatively coupled among a first input terminal receiving a first ramp signal used for first and third steps, a third input terminal receiving the pixel signal, and a negative input terminal of the comparison block, and suitable for performing CDS; a switch coupled between a second input terminal receiving a second ramp signal used for a second step and a positive input terminal of the comparison block; a capacitor coupled between a ground terminal and the positive input terminal of the comparison block; an amplification block suitable for buffering a comparison signal outputted from the comparison block; and a feedback control unit suitable for generating a control signal for controlling the switch based on the buffered comparison signal. The first ramp signal has a constant value during the second step, and is changed to have a slope different from a slope of the first step during the third step.

In an embodiment, a comparator may include: a comparison block suitable for comparing a pixel signal and ramp signals having different slopes for respective steps; a CDS block suitable for performing CDS, the CDS block being coupled between a fourth input terminal receiving the pixel signal and a negative input terminal of the comparison block, and suitable for performing CDS; a first switch installed between the CDS block and a first input terminal receiving a first ramp signal used for first and second steps; a first capacitor coupled between a ground terminal and the CDS block; a second switch coupled between a second input terminal receiving a second ramp signal used for a third step and a positive input terminal of the comparison block; a second capacitor installed between a third input terminal receiving a third ramp signal for a fourth step and the positive input terminal of the comparison block; an amplification block suitable for buffering a comparison signal outputted from the comparison block; and a feedback control unit suitable for generating first and second switch control signals for controlling the first and second switches based on the buffered comparison signal. The first ramp signal is retained as a constant value during the second step operation, and changed to have a slope different from a slope of the first step during the third step operation.

In an embodiment, an operating method of a comparator may include: performing a rest operation; performing a first step operation; performing a second step operation; and performing a third step operation. The performing of the first step operation comprises re-inputting a pixel signal and storing a difference value between the re-inputted pixel signal and a first ramp signal, when a logic level of a comparison signal is changed during the first step operation. The first ramp signal is retained as a constant value during the second step operation, and changed to have a slope different from a slope of the first step during the third step operation.

In an embodiment, a CIS may include: a pixel array suitable for outputting a pixel signal corresponding to incident light; a row decoder suitable for selecting and controlling a pixel within the pixel array for each row line, according to control of a control unit; a ramp signal generator suitable for generating a ramp signal for each of multiple steps according to control of the control unit; a comparison unit suitable for comparing the value of each pixel signal outputted from the pixel array to the value of a corresponding ramp signal applied from the ramp signal generator, receiving a pixel signal again when the phase of a comparison signal is changed during a first step operation, and storing a difference value between a first ramp signal and the received pixel signal; a counting unit suitable for counting a clock from the control unit according to each output signal from the comparison unit; a memory unit suitable for storing the counting information from the counting unit according to control of the control unit; the control unit suitable for controlling the operations of the row decoder, the ramp signal generator, the counting unit, the memory unit and a column readout circuit; and the column readout circuit suitable for outputting data of the memory unit according to control of the control unit.

BRIEF DESCRIPTION OF THE DRAWINGS

The above and other features and advantages of the present invention will become more apparent to those skilled in the art to which the present invention belongs by describing in detail various embodiments thereof with reference to the attached drawings in which:

FIG. 4B is a diagram for describing a four-step operation of the comparator of FIG. 4A.

DETAILED DESCRIPTION

Figure 1A:
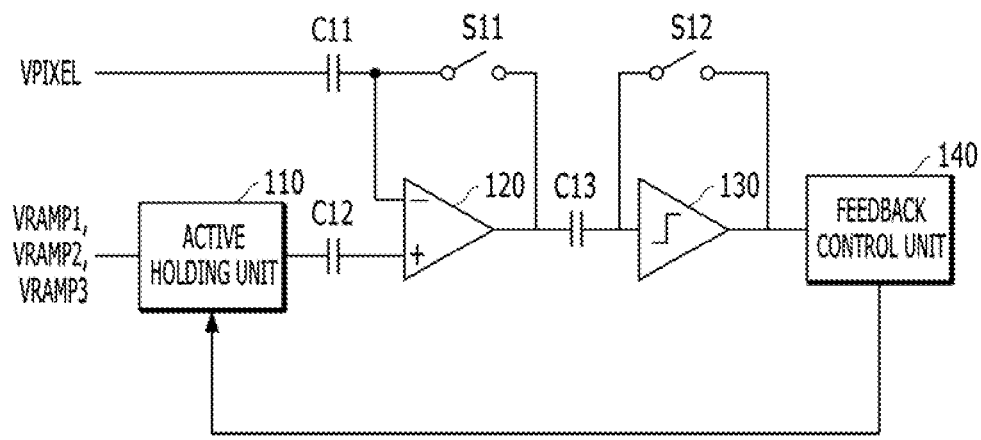
FIG. 1A is a diagram illustrating a conventional comparator.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale and in some instances, proportions may have been exaggerated in order to clearly illustrate features of the embodiments.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element (also referred to as a feature) described in connection with one embodiment may be used singly or in combination with other elements of another embodiment, unless specifically indicated otherwise.

FIG. 1A is a diagram illustrating a conventional comparator.

Referring to FIG. 1A, the conventional comparator includes an active holding unit 110, first to third capacitors C11 to C13, an operational amplifier 120, a buffer 130, a feedback control unit 140 and first and second switches S11 and S12.

The first capacitor C11 stores a value based on a pixel signal VPIXEL from a pixel (not illustrated). The second capacitor C12 stores a value transmitted through a ramp signal from a ramp signal generator (not illustrated). For example, the ramp signal may include first to third ramp signals VRAMP1 to VRAMP3. The active holding unit 110 transmits the ramp signal inputted from the ramp signal generator to the second capacitor C12. The operational amplifier 120 compares the values stored in the first and second capacitors C11 and C12. The third capacitor C13 transmits only an AC component of the value compared by the operational amplifier 120 to the buffer 130. The buffer 130 buffers the signal transferred through the capacitor C13 to output a comparison signal. The first and second switches S11 and S12 are switched in synchronization with a clock signal which serves as a reference signal during an operation of determining a digital value corresponding to a pixel signal provided from a pixel.

Figure 1B:
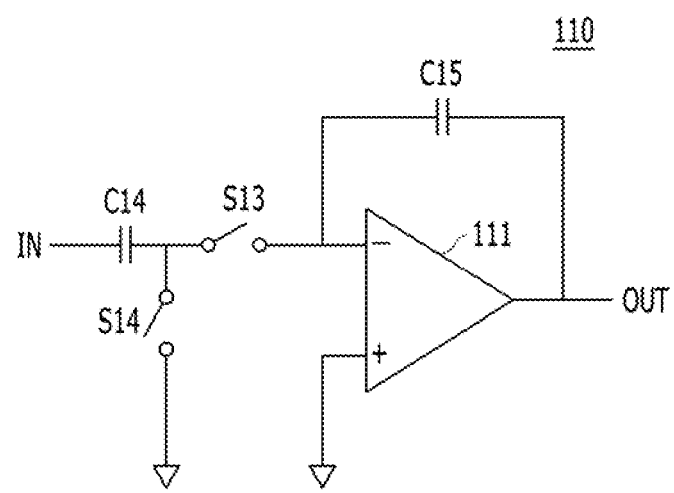
FIG. 1B is a detailed diagram of an active holding unit illustrated in FIG. 1A.

FIG. 1B is a detailed diagram of the active holding unit 110 shown in FIG. 1A.

Referring to FIG. 1B, the active holding unit 110 may include a fourth capacitor C14 coupled to an input terminal IN, third and fourth switches S13 and S14, an operational amplifier 111, and a fifth capacitor C15 coupled between an output terminal OUT and a negative input terminal (−) of an operational amplifier 111.

The active holding unit 110 selectively transmits the ramp signals VRAMP1 to VRAMP3 to the second capacitor C12, in response to a feedback signal provided from the feedback control unit 140. The active holding unit 110 amplifies the ramp signal inputted through the input terminal IN at a capacitance ratio of the fifth capacitor C15 to the fourth capacitor C14, and transmit the amplified ramp signal to the second capacitor C12. The output terminal OUT of the active holding unit 110 has a very high impedance, for providing a stable amplified ramp signal to the capacitor C12. In addition, after the comparison operation using the first ramp signal, the active holding unit 110 may maintain the state until a comparison operation using the second ramp signal begins.

The fourth switch S14 is switched on and off in synchronization with the clock signal, like the first and second switches S11 and S12. When the feedback signal is activated, the third switch S13 is turned off to block the ramp signals VRAMP1 to VRAMP3 from being transmitted to the second capacitor C12. The feedback signal is activated when the voltage of a ramp signal, which is being compared, equals the voltage of the first capacitor C12 storing the pixel signal.

Referring now to FIGS. 1A and 1B, the operation of the comparator will be described.

First, a ramp signal may fall (or rise) stage by stage by a predetermined amount, according to the specification of the internal operation of the CMOS image sensor. That is, the ramp signal may fall (or rise) according to the comparison characteristic of the CMOS image sensor. The operation specification may regulate the bit number of a digital value that is obtained by converting information on light incident on a pixel. For example, when information on each pixel is processed into 10-bit digital information, the ramp signal may fall (or rise) by 1,024 stages.

When a ramp signal is compared to a pixel signal, the ramp signal needs to fall (or rise) 1,024 times to be compared to the level of the pixel signal. Hence, the conventional comparator of FIGS. 1 and 1Aa requires a rather long time for generating a comparison signal which makes it difficult to maintain the reliability of the ramp signal. Furthermore, if for example, a 12-bit digital information is used instead of a 10-bit digital information, the ramp signal must fall (or rise) by 4,096 stages.

Thus, in order to resolve such a concern, the ramp signal may be implemented with a multi-step structure. For example, suppose that a 10-bit pixel value is generated by using the ramp signal with two-step structure. In this case, the CMOS image sensor may generate a first ramp signal which falls through 32 stages, compare the generated ramp signal to a pixel signal, and, based on the comparison result value, further compare the pixel signal to a second ramp signal which falls through 32 stages. The second ramp signal, which falls through 32 stages, may indicate a ramp signal which falls through 32 stages obtained by dividing one step of the first ramp signal. When the comparator is implemented in such a manner, the ramp signal may fall or rise only through 32 stages, even though a pixel value is set to 10 bits. Thus, the reliability may be improved. Furthermore, the ramp signal may be implemented with three or four steps, instead of two steps.

Further, when a ramp signal is implemented with three steps, the comparator may extract a first ramp code by comparing a pixel signal to a first ramp signal at a first step, extract a second ramp code using a second ramp signal at a second step, and extract a third ramp code using a third ramp signal at a third step. Then, the comparator may combine the extracted three ramp codes, thereby finally extracting an N-bit digital value for the pixel signal, where N is a natural number.

As described above, the comparator of FIG. 1A includes the active holding unit 110 for receiving the ramp signals VRAMP1 to VRAMP3, and an additional feedback line for implementing a multi-step structure. However, the addition of the active holding unit 100 increases the size and power consumption of the comparator.

Figure 2A:
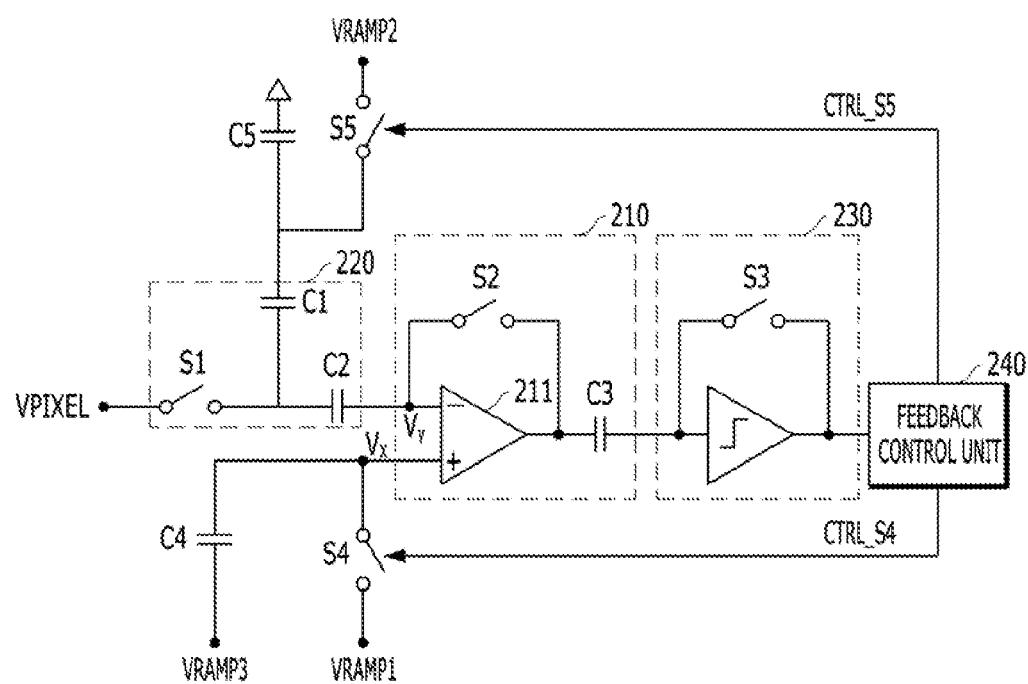
FIG. 2A is a diagram illustrating another conventional comparator.
Figure 2B:
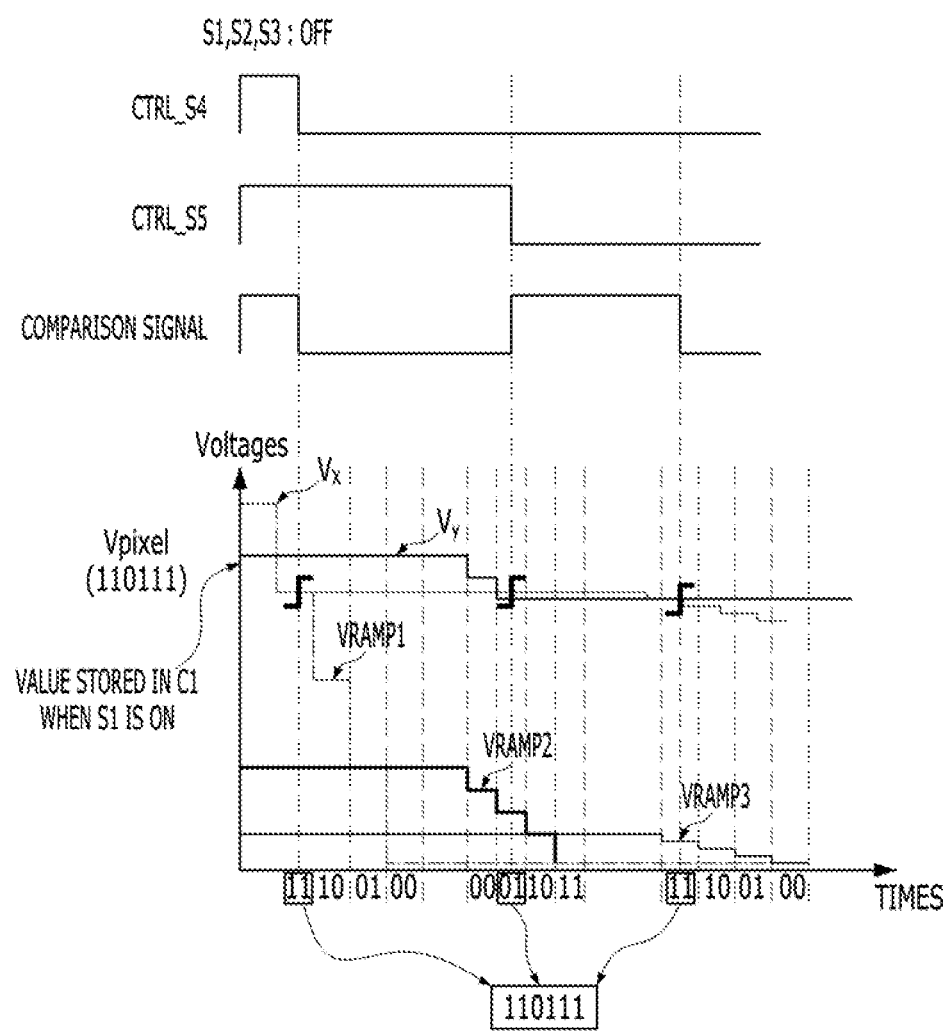
FIG. 2B is a diagram for describing a three-step operation of the comparator of FIG. 2A.

FIG. 2A is a diagram illustrating another conventional comparator, and FIG. 2B is a diagram illustrating a three-step operation of the comparator of FIG. 2A.

As illustrated in FIG. 2A, the comparator includes a comparison block 210, a CDS block 220, a fourth switch S4, a fifth switch S5, a fifth capacitor C5, a fourth capacitor C4, an amplification block 230 and a feedback control unit 240.

The comparison block 210 may compare a pixel signal VPIXEL to ramp signals VRAMP1 to VRAMP3. The CDS block 220 which performs CDS, is coupled between a negative input terminal (−) of the comparison block 210 and a fourth input terminal receiving the pixel signal VPIXEL. The fourth switch S4 is coupled between a positive input terminal (+) of the comparison block 210 and a first input terminal receiving a first ramp signal VRAMP1 for a first step. The fifth switch S5 is coupled between the CDS block 220 and a second input terminal receiving a second ramp signal VRAMP2 for a second step. The fifth capacitor C5 is coupled between a ground terminal and the CDS block 220. The fourth capacitor C4 is coupled between the positive input terminal of the comparison block 210 and a third input terminal receiving a third ramp signal VRAMP3 for a third step. The amplification block 230 buffers the signal transferred from the comparison block 210 to output a comparison signal. The feedback control unit 240 outputs fourth and fifth switch control signals CTRL_S4 and CTRL_S5 for controlling the fourth and fifth switches S4 and S5 according to the comparison signal.

The fifth switch S5 and the fifth capacitor C5 may be added to expand the number of steps from two to three.

The comparison block 210 may include a comparator (i.e., an operational amplifier), a second switch S2 and a third capacitor C3. The CDS block 220 may include a first switch S1, a first capacitor C1 and a second capacitor C2. The amplification block 230 may include a buffer and a third switch S3. Since these components are well-known, detailed descriptions thereof are omitted herein. Referring to FIGS. 2A and 2B, the operation of the comparator will be described as follows.

First Step

When the fourth switch control signal CTRL_S4 is activated to turn on the fourth switch S4 coupled to the first input terminal, the first ramp signal VRAMP1 is applied to the fourth capacitor C4 coupled to the third input terminal receiving the third ramp signal VRAMP3, and when the fourth switch control signal CTRL_S4 is deactivated to turn off the fourth switch S4, a voltage applied to the fourth capacitor C4 may be retained, and the pixel signal VPIXEL is applied to the first capacitor C1 of the CDS block 220 and then retained.

Second Step

When the fifth switch control signal CTRL_S5 is activated to turn on the fifth switch S5 coupled to the second input terminal receiving the second ramp signal VRAMP2, the second ramp signal VRAMP2 is applied to the fifth capacitor C5, and when the fifth switch control signal CTRL_S5 is deactivated to turn off the fifth switch S5, a voltage applied to the fifth capacitor C5 is retained.

Third Step

The third ramp signal VRAMP3 is applied to the fourth capacitor C4 coupled to the third input terminal, the second ramp signal VRAMP2 increases by a difference between the pixel signal VPIXEL stored in the first capacitor C1 and the second ramp signal VRAMP2 stored in the fifth capacitor C5, and the third ramp signal VRAMP3 increases by a difference between the third ramp signal VRAMP3 and the first ramp signal VRAMP1 stored in the fourth capacitor C4.

The second input terminal receiving the second ramp signal VRAMP2 and the fourth input terminal receiving the pixel signal VPIXEL is coupled in parallel to each other, and three ramp signals VRAMP1 to VRAMP3 corresponding to the respective steps may be used.

Referring to FIG. 2B, the comparator generates a comparison signal by comparing the ramp signal and the pixel signal at the first step, and turns off the fourth switch S4 to hold a Vx voltage which is changed according to the first ramp signal VRAMP1. For example, a count value '11' corresponding to the timing when the comparison signal transitions, is determined as first and second bits of a final comparison signal.

Then, at the second step, the comparator changes a Vy voltage using the second ramp signal and the first and second capacitors C1 and C2. Due to this process, the comparator may generate a comparison signal once more, and output third and fourth bits of the generated comparison signal as '01', while holding the Vy voltage at this time. For example, a count value '01' corresponding to the timing when the comparison signal transitions, is determined as third and fourth bits of the final comparison signal.

At the third step, the comparator may apply the third ramp signal VRAMP3 through the fourth capacitor C4, generate a comparison signal once more by changing the Vx voltage by the third ramp signal VRAMP3, and output the last lower two bits, thereby obtaining an analog-to-digital conversion value of a total of 6 bits. For example, a count value '11' corresponding to the timing when the comparison signal transitions, is determined as fifth and sixth bits of the final comparison signal. Thus, through the first to third steps, the analog-to-digital conversion value (i.e., the final comparison signal) is determined as '110111'.

As described above, in order to implement a three-step ADC, the comparator shown in FIG. 2A requires three lines for providing the ramp signals RAMP1 to RAMP3, and a plurality of capacitors. In particular, the size and power consumption of the comparator is increased due to the switches and capacitors which are added to the respective ramp signal lines to implement the three steps.

In accordance with an embodiment of the present invention, an improved multi-step comparator is provided, having a reduced number of capacitors and switching elements in comparison to a conventional multi-step ADC. Thus, the size and the power consumption of the comparator according to an embodiment of the present may be reduced during an analog-to-digital conversion process with three or more steps. Referring now to FIGS. 3A to 4B, the embodiment will be described in detail.

Figure 3A:
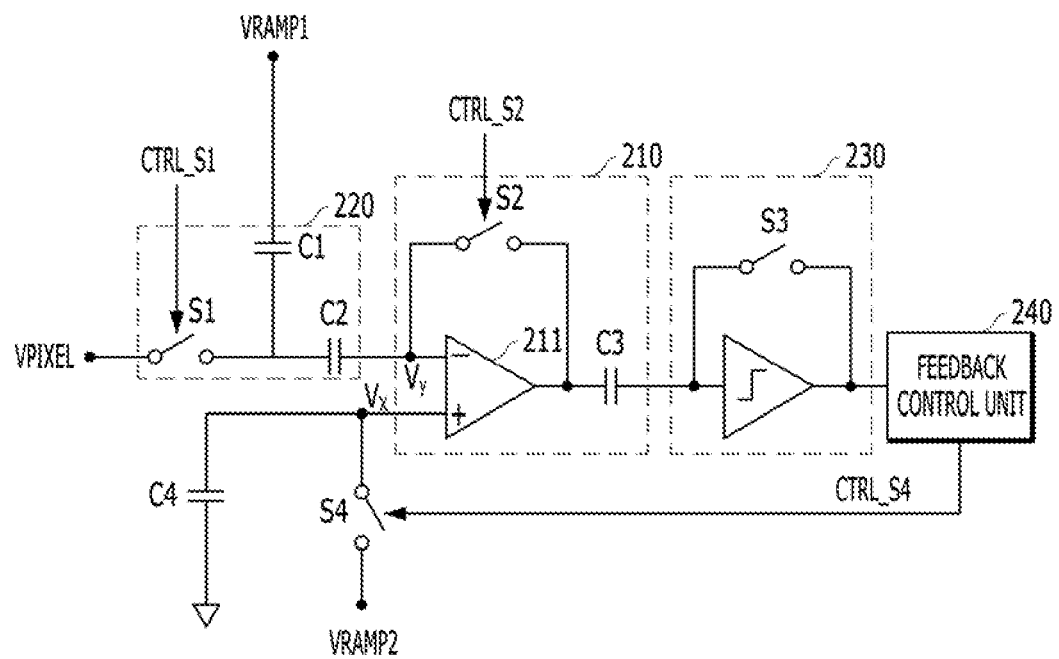
FIG. 3A is a diagram illustrating a comparator in accordance with an embodiment of the present invention.

Specifically, FIG. 3A is a diagram illustrating a comparator in accordance with an embodiment of the present invention.

As illustrated in FIG. 3A, the comparator may include a comparison block 210, a CDS block 220, a fourth switch S4, a fourth capacitor C4, an amplification block 230 and a feedback control unit 240.

The comparison block 210 may compare a pixel signal VPIXEL to ramp signals VRAMP1 and VRAMP2. The CDS block 220 may be coupled among a first input terminal receiving a first ramp signal VRAMP1 used for first and third steps, a third input terminal receiving the pixel signal VPIXEL, and a negative terminal (−) of the comparison block 210, and perform CDS. The fourth switch S4 may be coupled between a second input terminal receiving a second ramp signal VRAMP2 used for a second step and a positive input terminal (+) of the comparison block 210. The fourth capacitor C4 may be coupled between a ground terminal and the positive input terminal of the comparison block 210. The amplification block 230 may buffer the signal transferred from the comparison block 210 to output a comparison signal. The feedback control unit 240 may output a fourth switch control signal CTRL_S4 for controlling the fourth switch S4 according to the comparison signal.

When a logic level of the comparison signal (i.e., an output signal of the comparison block 210) is changed during the operation of the first step, the comparator of FIG. 3A may turn on the first switch S1 of the CDS block 220, and store a difference value between the changed first ramp signal and a re-inputted pixel signal into the first capacitor C1 of the CDS block 220. Then, the comparator of FIG. 3A may turn off the first switch S1 to maintain the difference value stored in the first capacitor C1.

In the comparator of FIG. 3A, the positions of input terminals for receiving the first and second ramp signals VRAMP1 and VRAMP2 may be exchanged, compared to the comparator of FIG. 2A. Furthermore, the fifth capacitor C5, the fifth switch S5 and the third ramp signal used in the comparator of FIG. 2A is removed to accomplish a small area and low power consumption.

The comparison block 210 may include an operational amplifier 211, a second switch S2 and a third capacitor C3. In a variation of the Illustrated embodiment, the comparison block 210 may include the operational amplifier 211 and the second switch S2 only. The CDS block 220 may include a first switch S1, a first capacitor C1 and a second capacitor C2. The amplification block 230 may include a buffer and a third switch S3 or include merely the buffer. Since the individual components are well-known, detailed descriptions thereof are omitted herein.

Figure 3B:
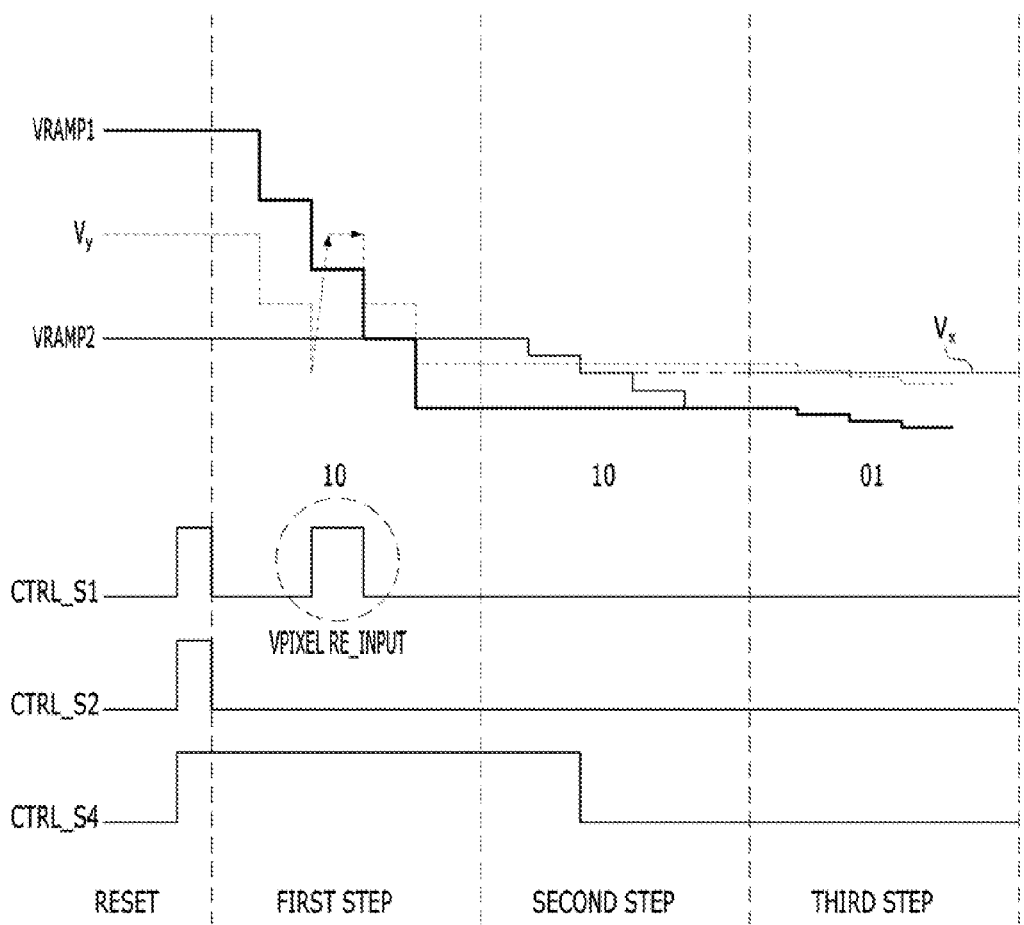
FIG. 3B is a diagram for describing a three-step operation of the comparator of FIG. 3A.

FIG. 3B is a diagram for describing a three-step operation of the comparator of FIG. 3A.

The entire operation of the comparator of FIG. 3A may be performed in the order of a reset operation, a first step operation, a second step operation, and a third step operation.

Reset Operation

During the reset operation, all of the first, second and fourth switches S1, S2 and S4 may be turned on. The first capacitor C1 may store a difference value between the first ramp signal VRAMP1 and the pixel signal VPIXEL. As the second switch S2 is turned on, an offset value of the comparator and the pixel signal VPIXEL may be stored in the second capacitor C2, and a difference value between the second ramp signal VRAMP2 and a reference voltage (e.g., a ground voltage) may be stored in the fourth capacitor C4.

First Step Operation

During the first step operation, the first and second switches S1 and S2 may be turned off. While the fourth switch S4 is turned on, the first ramp signal VRAMP1 may be changed as illustrated in the timing diagram of FIG. 3B. When a logic level of the comparison signal (i.e., output signal of the comparison block 210) is changed by the operation of the first ramp signal VRAMP1, a digital code value corresponding to the transition timing may be stored, the first switch S1 may be turned on to store a difference value between the pixel signal VPIXEL and the changed first ramp signal stored in the first capacitor C1 (see 'Vy'), and the first switch S1 may be turned off to maintain the difference value. That is, when a logic level of the comparison signal is changed during the first step operation, the pixel signal VPIXEL may be re-inputted to store a difference value between the first ramp signal VRAMP1 and the pixel signal VPIXEL. When the first step operation of the first ramp signal VRAMP1 is completed, the first ramp signal VRAMP1 may be retained as a constant value, and the fourth switch S4 may continuously maintain the turn-on state.

Second Step Operation

During the second step operation, while the fourth switch S4 is turned on, the second ramp signal VRAMP2 may have a different slope from the first ramp signal VRAMP1 as illustrated in the timing diagram of FIG. 3B. When a logic level of the comparison signal is changed by the operation of the second ramp signal VRAMP2, a digital code value corresponding to the transition timing may be stored, and the fourth switch S4 may be turned off. The fourth capacitor C4 may store a difference value between the second ramp signal VRAMP2 and the reference voltage (see 'Vx').

Third Step Operation

During the third step operation, the first ramp signal VRAMP1 that is retained as the constant value in the first step operation may ramp-down with a slope that is different from that of the first and second step operations as illustrated in FIG. 3B. When a logic level of the comparison signal is changed by the operation of the first ramp signal VRAMP1, a digital code value corresponding to the transition timing may be stored, thereby determining the entire digital code conversion value.

Figure 4A:
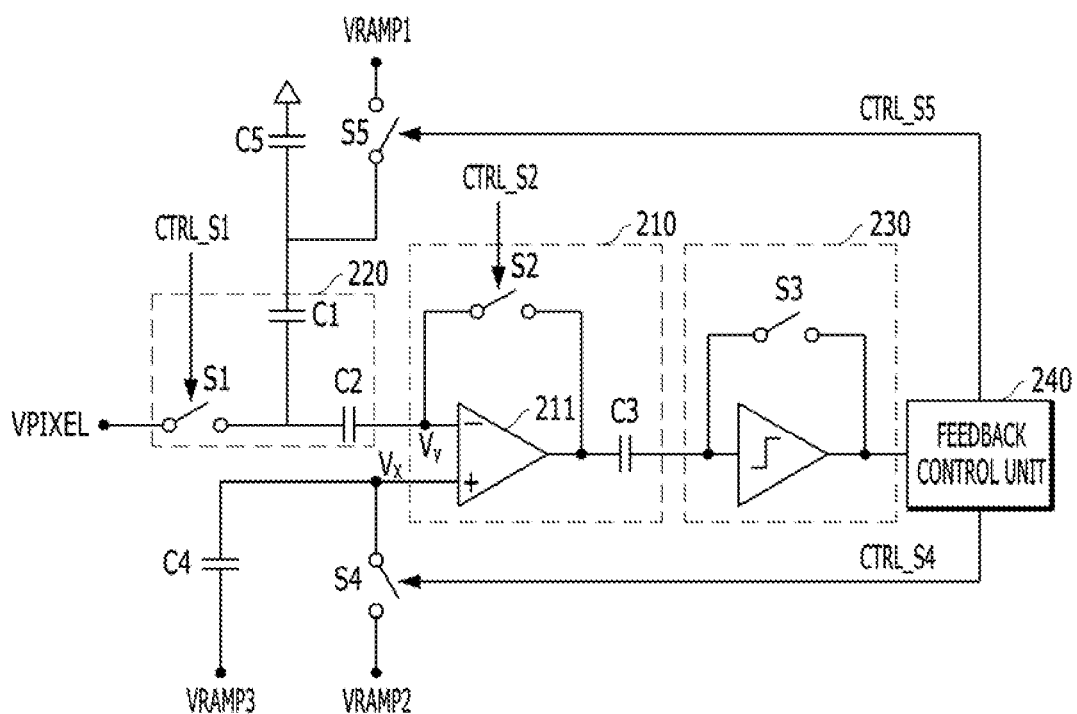
FIG. 4A is a diagram illustrating a comparator in accordance with another embodiment of the present invention.

FIG. 4A is a diagram illustrating a comparator in accordance with another embodiment of the present invention.

As illustrated in FIG. 4A, the comparator may include a comparison block 210, a CDS block 220, a fifth switch S5, a fifth capacitor C5, a fourth switch S4, a fourth capacitor C4, an amplification block 230 and a feedback control unit 240. The comparison block 210 may compare a pixel signal VPIXEL and ramp signals VRAMP1 to VRAMP3. The CDS block 220 may be coupled between a negative input terminal (−) of the comparison block 210 and a fourth input terminal receiving the pixel signal VPIXEL, and perform CDS. The fifth switch S5 may be coupled between the CDS block 220 and a first input terminal receiving a first ramp signal VRAMP1 used for first and second steps. The fifth capacitor C5 may be coupled between a ground terminal and the CDS block 220. The fourth switch S4 may be coupled between a positive input terminal (+) of the comparison block 210 and a second input terminal receiving a second ramp signal VRAMP2 used for a third step. The fourth capacitor C4 may be coupled between the positive input terminal of the comparison block 210 and a third input terminal receiving a third ramp signal VRAMP3 used for a fourth step. The amplification block 230 may buffer the signal transferred from the comparison block 210 to output a comparison signal. The feedback control unit 240 may output fourth and fifth switch control signals CTRL_S4 and CTRL_S5 for controlling the fourth and fifth switches S4 and S5 according to the comparison signal.

When a logic level of the comparison signal (i.e., an output signal of the comparison block 210) is changed during the operation of the first step, the comparator of FIG. 4A may turn on the first switch S1 of the CDS block 220, and store a difference value between the changed first ramp signal and a re-inputted pixel signal into the first capacitor C1 of the CDS block 220. Then, the comparator of FIG. 4A may turn off the first switch S1 to maintain the difference value between the changed first ramp signal and the re-inputted pixel signal, which is stored in the first capacitor C1.

In the comparator of FIG. 4A, the positions of input terminals for receiving the first and second ramp signals VRAMP1 and VRAMP2 may be exchanged, and the operation may be changed from a three-step operation to a four-step operation, compared to the comparator of FIG. 2A.

Furthermore, since the comparison block 210, the CDS block 220 and the amplification block 230 may be implemented similarly as described with reference to FIG. 3A, the detailed descriptions thereof are omitted herein.

FIG. 4B is a diagram illustrating a four-step operation of the comparator of FIG. 4A.

The entire operation of the comparator in FIG. 4A may be performed in the order of a reset operation, a first step operation, a second step operation, a third step operation, and a fourth step operation.

Reset Operation

During the reset operation, all of the first to fifth switches S1 to S5 may be turned on. The first capacitor C1 may store a difference value between the first ramp signal VRAMP1 and the pixel signal VPIXEL. When the second switch S2 is turned on, an offset value of the comparator and the pixel signal VPIXEL may be stored in the second capacitor C2, and a difference value between the second ramp signal VRAMP2 and the third ramp signal VRAMP3 may be stored in the fourth capacitor C4.

First Operation

During the first step operation, the first to third switches S1 to S3 may be turned off. While the fourth and fifth switches S4 and S5 are turned on, the first ramp signal VRAMP1 may be changed as illustrated in the timing diagram of FIG. 4B. When a logic level of the comparison signal (i.e., output signal of the comparison block 210) is changed by the operation of the first ramp signal VRAMP1, a digital code value corresponding to the transition timing may be stored, the first switch S1 may be turned on to store a difference value between the pixel signal VPIXEL and the changed first ramp signal stored in the first capacitor C1 (see 'Vy'), and the first switch S1 may be turned off to maintain the difference value. That is, when a logic level of the comparison signal is changed during the first step operation, the pixel signal VPIXEL may be re-Inputted to store a difference between the first ramp signal VRAMP1 and the pixel signal VPIXEL. When the first step operation of the first ramp signal VRAMP1 is completed, the first ramp signal VRAMP1 may be retained as a constant value, and the fourth and fifth switches S4 and S5 may continuously maintain the turn-on state.

Second Step Operation

During the second step operation, while the fourth and fifth switch control signals are turned on, the second ramp signal VRAMP2 may have a different slope from the first ramp signal VRAMP1 as illustrated in the timing diagram of FIG. 4B, and then the second ramp signal VRAMP2 may be fixed to a constant value. When a logic level of the comparison signal is changed by the operation of the second ramp signal VRAMP2, a digital code value corresponding to the transition timing may be stored, and the fourth switch S4 may be turned off. The fourth capacitor C4 may store and retain a difference value between the second ramp signal VRAMP2 and the third ramp signal VRAMP3, and the fifth capacitor C5 may store and retain a difference value between the second ramp signal VRAMP2 and a reference voltage (i.e., a ground voltage).

Third Step Operation

During the third step operation, while the fifth switch S5 is turned on, the first ramp signal VRAMP1 that is retained as the constant value in the first step operation may ramp-down with a slope that is different from that of the first and second step operations as illustrated in the timing diagram of FIG. 4B. When a logic level of the comparison signal is changed by the operation of the first ramp signal VRAMP1, a digital code value corresponding to the transition timing may be stored, and the fifth switch S5 may be turned off. The fourth capacitor C4 may store and retain a difference value between the changed second ramp signal VRAMP2 and the third ramp signal VRAMP3.

Fourth Step Operation

During the fourth step operation, the third ramp signal may have a different slope from the first and second ramp signal VRAMP1 and VRAMP2 as illustrated in the timing diagram of FIG. 4B. When a logic level of the comparison signal is changed by the operation of the third ramp signal VRAMP3, a digital code value corresponding to the transition timing may be stored, thereby determining the entire digital code conversion value.

Figure 5:
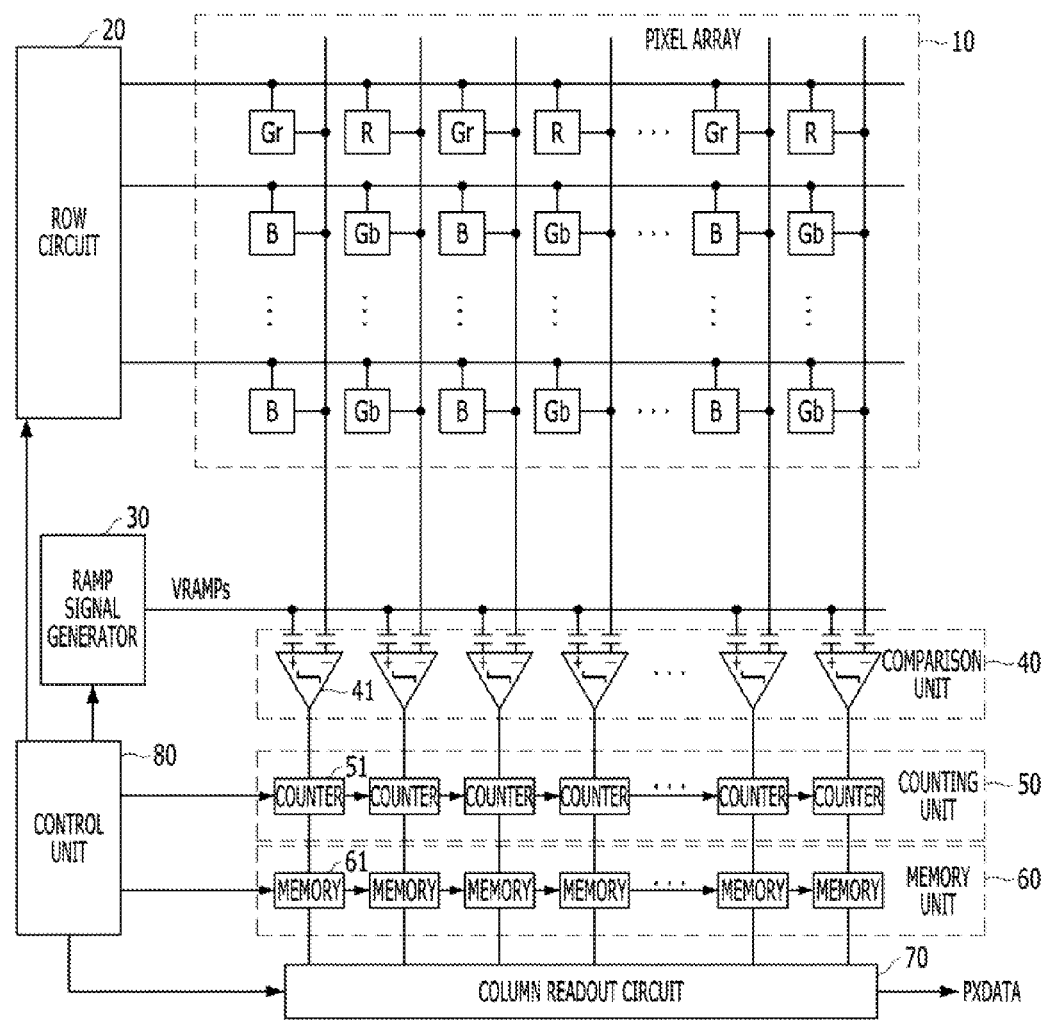
FIG. 5 is a diagram illustrating a CMOS image sensor in accordance with an embodiment of the present invention.

FIG. 5 is a diagram of a CMOS image sensor employing a comparator in accordance with an embodiment of the present invention. FIG. 5 shows a CMOS image sensor with a column parallel scheme.

As illustrated in FIG. 5, the CMOS image sensor may include a pixel array 10, a row circuit 20, a ramp signal generator 30, a comparison unit 40, a counting unit 50, a memory unit 60, a control unit 80 and a column readout circuit 70.

The pixel array 10 may output pixel signals corresponding to incident light. The row decoder 20 may select a pixel within the pixel array 10 for each row line under the control of the control unit 80, and control the operation of the selected pixel. The ramp signal generator 30 may generate ramp signals VRAMPs for each step under the control of the control unit 80. The comparison unit 40 may compare the value of each pixel signal outputted from the pixel array 10 to the ramp signals VRAMPs applied from the ramp signal generator 30. The counting unit 50 may count a clock signal applied from the control unit 80 according to each output signal of the comparison unit 40. The memory unit 60 may store the counting information applied from the counting unit 50 under the control of the control unit 80. The control unit 80 may control the operations of the row decoder 20, the ramp signal generator 30, the counting unit 50, the memory unit 60 and the column readout circuit 70. The column readout circuit 70 may sequentially output data of the memory unit 60 as pixel data PXDATA under the control of the control unit 80.

In order to remove an offset value of each pixel, the CMOS image sensor may compare the pixel signals (i.e., pixel output voltages) before and after a light signal is incident, and measure only the pixel signal component generated by the incident light. Such a technique is referred to as correlated double sampling (CDS). The CDS may be performed by the comparison unit 40.

The comparison unit 40 may include a plurality of comparators 41, the counting unit 50 may include a plurality of counters 51, and the memory unit 60 may include a plurality of memories 51. At least one comparator, at least one counter, and at least one memory may be disposed at each column.

The operation of one comparator, one counter and one memory will be described as follows.

First, a first comparator 41 may receive a pixel signal outputted from a first column of the pixel array 10 through one terminal thereof, receive the ramp signals VRAMPs applied from the ramp signal generator 30 through the other terminal thereof, and compare the values of the two signals to output a comparison signal.

Since the ramp signals VRAMPs have voltage levels which fall with respect to time, the values of the two signals inputted to each comparator may coincide with each other at a certain point in time. After the values of the two signals coincide with each other, the value of the comparison signal outputted from each comparator is inverted.

Thus, a first counter 51 may count the clock signal applied from the control unit 80 from the time when the ramp signal starts to fall to the time when the comparison signal outputted from the comparator 41 is inverted, and output the counting information. Each of the counters may be reset according to a reset signal from the control unit 80.

Then, a first memory 61 may store the counting information provided applied from the counter 51 according to a load signal from the control unit 80, and output the stored counting information to the column readout circuit 70.

As described above, the three-step comparison method in accordance with the embodiment shown in FIG. 3A may remove one capacitor, one switch and one ramp signal in comparison to the three-step comparison method of FIGS. 2A and 2B, and the four-step comparison method in accordance with the embodiment shown in FIG. 3A may also remove one capacitor, one switch and one ramp signal in comparison to the four-step comparison method of FIGS. 2A and 2B.

It is noted that the above-described embodiments may be expanded to include five steps or six steps as well as the three steps and four steps.

In accordance with the present embodiments, the numbers of capacitors and switches may be reduced in comparison to a conventional multi-step ADC, and thus the size and the power consumption may be reduced during the analog-to-digital conversion process with three or more steps.

Therefore, the present embodiments may provide a structure that is optimized to implement a high-speed and high-resolution ADC with multiple steps and a CMOS image sensor including the same.

Although various embodiments have been described for illustrative purposes, it will be apparent to those skilled in the art that various other changes and modifications may be made without departing from the spirit and scope of the invention as defined in the following claims. For example, in the described embodiments, a multi-step, single slope, analog-to-digital converter was taken as an example. However, the present invention is not limited thereto. Also, it is noted that the high-speed, high-resolution comparator of the present invention can employ two or more ramp signals.

What is claimed is:

1. A comparator comprising:
    a comparison block suitable for comparing a pixel signal and a plurality of ramp signals;
    a correlated double sampling (CDS) block operatively coupled among a first input terminal receiving a first ramp signal used for first and third steps, a third input terminal receiving the pixel signal, and a negative input terminal of the comparison block, and suitable for performing CDS;
    a switch coupled between a second input terminal receiving a second ramp signal used for a second step and a positive input terminal of the comparison block;
    a capacitor coupled between a ground terminal and the positive input terminal of the comparison block;
    an amplification block suitable for buffering a comparison signal outputted from the comparison block; and
    a feedback control unit suitable for generating a control signal for controlling the switch based on the buffered comparison signal,
    wherein the first ramp signal has a constant value during the second step, and is changed to have a slope different from a slope of the first step during the third step.

2. The comparator of claim 1, wherein each ramp signal has different slopes for the respective steps.

3. The comparator of claim 1, wherein when a logic level of the comparison signal is changed during the first step, the pixel signal is re-inputted through the CDS block, and a difference value between the re-inputted pixel signal and the first ramp signal to be changed is stored in the CDS block.

4. The comparator of claim 3, wherein the CDS block includes a switch suitable for switching the pixel signal, and a capacitor suitable for storing the difference value.

5. A comparator comprising:
    a comparison block suitable for comparing a pixel signal and ramp signals having different slopes for respective steps;
    a correlated double sampling (CDS) block suitable for performing CDS, the CDS block being coupled between a fourth input terminal receiving the pixel signal and a negative input terminal of the comparison block, and suitable for performing CDS;
    a first switch installed between the CDS block and a first input terminal receiving a first ramp signal used for first and second steps;
    a first capacitor coupled between a ground terminal and the CDS block;
    a second switch coupled between a second input terminal receiving a second ramp signal used for a third step and a positive input terminal of the comparison block;

a second capacitor installed between a third input terminal receiving a third ramp signal for a fourth step and the positive input terminal of the comparison block;

an amplification block suitable for buffering a comparison signal outputted from the comparison block; and a feedback control unit suitable for generating first and second switch control signals for controlling the first and second switches based on the buffered comparison signal, wherein the first ramp signal is retained as a constant value during the second step, and changed to have a slope different from a slope of the first step during the third step.

6. The comparator of claim 5, wherein when a logic level of the comparison signal is changed during the first step, the pixel signal is re-inputted through the CDS block, and a difference value between the re-inputted pixel signal and the first ramp signal to be changed is stored in the CDS block.

7. The comparator of claim 6, wherein the CDS block includes a third switch suitable for switching the pixel signal, and a third capacitor suitable for storing the difference value.

8. An operating method of a comparator with a correlated double sampling (CDS) scheme, the operating method comprising:
performing a rest operation;
performing a first step operation;
performing a second step operation; and
performing a third step operation,
wherein the performing of the first step operation comprises re-inputting a pixel signal and storing a difference value between the re-inputted pixel signal and a first ramp signal, when a logic level of a comparison signal is changed during the first step operation, and
wherein the first ramp signal is retained as a constant value during the second step operation, and changed to have a slope different from a slope of the first step during the third step operation.

9. The operating method of claim 8, wherein the performing of the first step operation comprises maintaining the difference value between the re-inputted pixel signal and the first ramp signal.

10. The operating method of claim 8, further comprising performing a fourth step operation.

* * * * *